United States Patent
Jiang et al.

(10) Patent No.: US 12,308,748 B2
(45) Date of Patent: May 20, 2025

(54) CONTROL METHOD AND CONTROL CIRCUIT OF SWITCHED-MODE POWER SUPPLY, AND SWITCHED-MODE POWER SUPPLY

(71) Applicant: Joulwatt Technology Co., Ltd., Hangzhou (CN)

(72) Inventors: Xianghua Jiang, Hangzhou (CN); Xiangyong Xu, Hangzhou (CN)

(73) Assignee: Joulwatt Technology Co., Ltd., Hangzhou (CN)

( * ) Notice: Subject to any disclaimer, the term of this patent is extended or adjusted under 35 U.S.C. 154(b) by 334 days.

(21) Appl. No.: 17/981,372

(22) Filed: Nov. 4, 2022

(65) Prior Publication Data

US 2023/0138876 A1   May 4, 2023

(30) Foreign Application Priority Data

Nov. 4, 2021   (CN) .......................... 202111300647.2

(51) Int. Cl.
  *H02M 3/335*   (2006.01)
  *H02M 1/08*    (2006.01)
(52) U.S. Cl.
  CPC ......... *H02M 3/3353* (2013.01); *H02M 1/083* (2013.01)

(58) Field of Classification Search
  CPC ........ H02M 1/08; H02M 1/081; H02M 1/082; H02M 1/083; H02M 3/335; H02M 3/33507; H02M 3/33515; H02M 3/33523; H02M 3/3353
  See application file for complete search history.

(56) References Cited

U.S. PATENT DOCUMENTS

| | | | |
|---|---|---|---|
| 9,106,132 B2 * | 8/2015 | Liu ...................... | H02M 3/156 |
| 10,903,745 B1 * | 1/2021 | Hariharan ............. | H02M 3/158 |
| 2020/0195155 A1 * | 6/2020 | Colbeck ............ | H02M 3/33571 |

* cited by examiner

*Primary Examiner* — Nguyen Tran
(74) *Attorney, Agent, or Firm* — Bayramoglu Law Offices LLC

(57) ABSTRACT

A control method and control circuit of a switched-mode power supply, and the switched-mode power supply are provided. An operating mode of the switched-mode power supply is controlled in a first mode and a second mode according to an output feedback signal of the switched-mode power supply. One operating period of the first mode includes a switch period of a boundary conduction mode (BCM), and one operating period of the second mode includes N switch periods of BCMs and a switch period of a discontinuous conduction mode (DCM). The auxiliary switch transistor is turned on once to discharge a parasitic capacitor of the main switch transistor when the switched-mode power supply enters the next operating period from one operating period of the current second mode before the next operating period starts or the switched-mode power supply enters the first mode from the current second mode before the first mode starts.

18 Claims, 5 Drawing Sheets

CONTROL METHOD AND CONTROL CIRCUIT OF SWITCHED-MODE POWER SUPPLY, AND SWITCHED-MODE POWER SUPPLY

CROSS REFERENCE TO THE RELATED APPLICATIONS

This application is based upon and claims priority to Chinese Patent Application No. 202111300647.2, filed on Nov. 4, 2021, the entire contents of which are incorporated herein by reference.

TECHNICAL FIELD

The present disclosure relates to the technical field of power electronics, and in particular, to a control method and control circuit of a switched-mode power supply, and the switched-mode power supply.

BACKGROUND

In the application of a switched-mode power supply, when load power changes, an operating mode of the switched-mode power supply is switched accordingly to obtain better system efficiency. For example, when the load power decreases, the operating mode of the switched-mode power supply enters into a discontinuous conduction mode (DCM) from a boundary conduction mode (BCM). When the load power increases, the operating mode of the switched-mode power supply enters into the BCM from the DCM.

The asymmetric half-bridge switched-mode power supply includes two switch transistors that form a half-bridge. By controlling on/off of the switch transistors, input energy is converted into desired output energy. However, the switch transistor usually has a parasitic capacitor, a relatively large switching loss may generate when the switch transistor is turned on under a circumstance that a charge in the parasitic capacitor is not zero. In mode switching, for example entering into the BCM, the charge in the parasitic capacitor of the switch transistor shall be released as much as possible before conduction to realize zero voltage conduction, but how to realize zero voltage conduction well is a technical problem.

SUMMARY

In view of this, an objective of the present disclosure is to provide a control method and control circuit of a switched-mode power supply, and the switched-mode power supply to solve the technical problem of how to realize zero voltage conduction in the prior art.

A technical solution of the present disclosure is to provide a control circuit of a switched-mode power supply. The switched-mode power supply includes a main switch transistor and an auxiliary switch transistor that form a half-bridge. The control circuit includes: an error amplifier circuit, configured to receive an output feedback signal of the switched-mode power supply to obtain an error compensation signal; and a switch control circuit, configured to receive the error compensation signal to set a first current curve and a first frequency curve based on the error compensation signal. The switch control circuit receives an inductor current sampling signal and an operating frequency signal of the switched-mode power supply, and controls on-off states of the main switch transistor and the auxiliary switch transistor according to comparison between the inductor current sampling signal and the first current curve and comparison between the operating frequency signal and the first frequency curve.

Preferably, the first current curve may be a variation curve of a preset inductor current signal with the error compensation signal. The first frequency curve may be a variation curve of a preset system operating frequency with the error compensation signal.

Preferably, the switch control circuit may include a current curve setting circuit and a frequency curve setting circuit. An operating mode of the switched-mode power supply may be set according to the error compensation signal. The current curve setting circuit may set the first current curve according to the operating mode of the switched-mode power supply. The frequency curve setting circuit may set the first frequency curve according to the operating mode of the switched-mode power supply.

The operating mode of the switched-mode power supply may include a first mode and a second mode, one operating period of the first mode may include a switch period of a BCM, and one operating period of the second mode may include N switch periods of BCMs and a switch period of a DCM.

Preferably, the switch control circuit may include a first comparison circuit and a second comparison circuit. When the switched-mode power supply operates in a certain mode, the first comparison circuit may compare the inductor current sampling signal of the switched-mode power supply with the first current curve to control the on-off state of the main switch transistor, and the second comparison circuit may compare the operating frequency signal of the switched-mode power supply with the first frequency curve to control the on-off state of the auxiliary switch transistor.

Preferably, the switched-mode power supply may include a primary winding, a secondary winding, and an auxiliary winding, and the control circuit may further include an input terminal configured to receive a voltage across any one of the primary winding, the secondary winding, and the auxiliary winding.

The control circuit may determine a zero cross time of a drain-source voltage of the main switch transistor according to the voltage received at the input terminal to control the on-off states of the main switch transistor and the auxiliary switch transistor.

Preferably, the control circuit may further include a logic circuit, a first driver, and a second driver. The logic circuit may generate switch control signals of the main switch transistor and the auxiliary switch transistor according to comparison results of the first comparison circuit and the second comparison circuit and the zero cross time of the drain-source voltage of the main switch transistor.

The first driver may receive the switch control signal to drive an on-off action of the main switch transistor.

The second driver may receive the switch control signal to drive an on-off action of the auxiliary switch transistor.

Preferably, the operating mode of the switched-mode power supply may include the first mode, the second mode, and a third mode, and one operating period of the third mode may include M operating periods of second mode with periodic time limitation plus a period of stop time.

Preferably, the auxiliary switch transistor and a first inductor, a first capacitor, and a primary winding in a transformer may form a resonant loop.

In a second aspect, the present disclosure provides a control method of a switched-mode power supply. The switched-mode power supply includes a main switch transistor and an auxiliary switch transistor that form a half-bridge. The control method includes:

controlling an operating mode of the switched-mode power supply in a first mode and a second mode according to an output feedback signal of the switched-mode power supply, where one operating period of the first mode includes a switch period of a BCM, and one operating period of the second mode includes N switch periods of BCMs and a switch period of a DCM, and turning on the auxiliary switch transistor once to discharge a parasitic capacitor of the main switch transistor when the switched-mode power supply enters the next operating period from one operating period of the current second mode or the switched-mode power supply enters the first mode from the current second mode and before the next operating period or the first mode starts to realize zero voltage conduction of the main switch transistor.

The control method may further include: setting the operating mode of the switched-mode power supply according to the output feedback signal of the switched-mode power supply, and setting a first current curve and a first frequency curve according to the operating mode of the switched-mode power supply; and when the switched-mode power supply operates in a certain mode, controlling on-off states of the main switch transistor and the auxiliary switch transistor according to comparison between an inductor current sampling signal of the switched-mode power supply and the first current curve and comparison between an operating frequency signal of the switched-mode power supply and the first frequency curve.

Further, a process of turning on the auxiliary switch transistor when the switched-mode power supply enters the next operating period from one operating period of the current second mode or the switched-mode power supply enters the first mode from the current second mode and before the next operating period or the first mode starts may specifically include the following steps: comparing the operating frequency signal of the switched-mode power supply with the first frequency curve to control turn-on of the auxiliary switch transistor according to a comparison result.

Further, the operating mode of the switched-mode power supply may be controlled in the first mode, the second mode, and a third mode according to the output feedback signal of the switched-mode power supply.

One operating period of the third mode may include M operating periods of second mode with periodic time limitation plus a period of stop time.

In a third aspect, the present disclosure provides a switched-mode power supply, including a main switch transistor and an auxiliary switch transistor that form a half-bridge. The auxiliary switch transistor and a first inductor, a first capacitor, and a primary winding in a transformer of the switched-mode power supply form a resonant loop, and the switched-mode power supply further includes the above control circuit.

Compared with the prior art, the switch circuit structure of the present disclosure has the following advantages: the asymmetric half-bridge switched-mode power supply is switched in the second mode and the first mode according to the output feedback signal. The auxiliary switch transistor is turned on once to discharge a parasitic capacitor of the main switch transistor when the switched-mode power supply enters the next operating period from one operating period of the current second mode or the switched-mode power supply enters the first mode from the current second mode and before the next operating period or the first mode starts, to realize zero voltage conduction of the main switch transistor. The switched-mode power supply of the present disclosure can well realize zero voltage conduction control of the asymmetric half-bridge switched-mode power supply, achieving desired effects.

DETAILED DESCRIPTION OF THE EMBODIMENTS

The preferred embodiments of the present disclosure are described in detail below with reference to the drawings, but the present disclosure is not limited to these embodiments. The present disclosure covers any substitution, modification, equivalent method and solution made within the spirit and scope of the present disclosure.

For a better understanding of the present disclosure, the specific details of the following preferred embodiments of the present disclosure are explained herein after in detail, while the present disclosure can also be fully understood by those skilled in the art without the description of these details.

The present disclosure is described in detail by giving examples with reference to the drawings. It should be noted that the drawings are simplified and do not use an accurate proportion, that is, the drawings are merely for the objectives of conveniently and clearly assisting in illustrating embodiments of the present disclosure.

Figure 1:
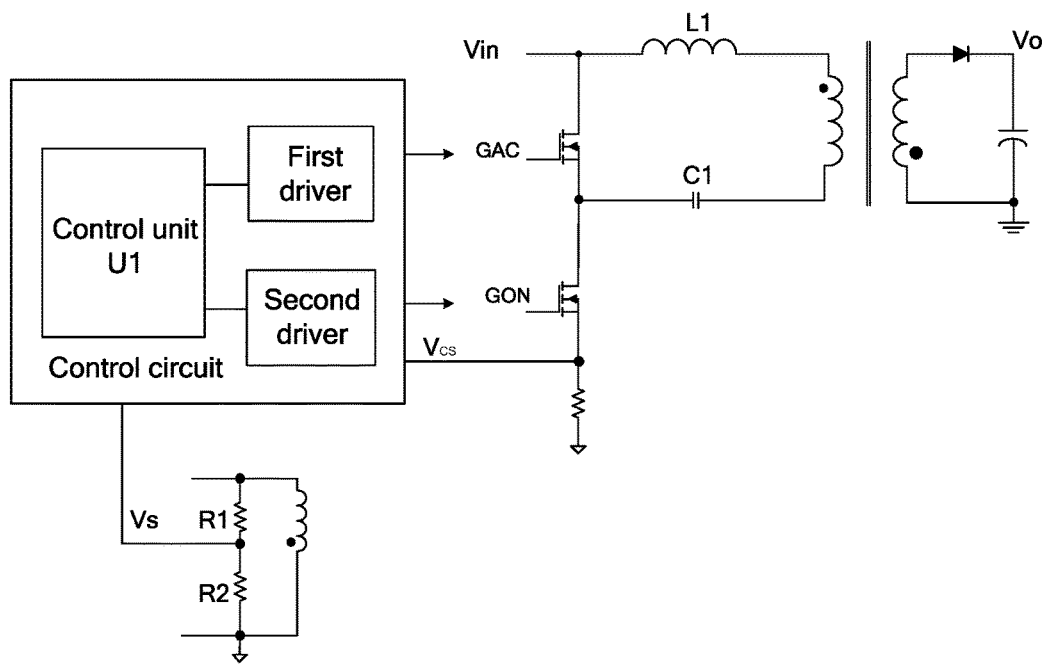
FIG. 1 is a circuit block diagram of a first embodiment of an asymmetric switched-mode power supply according to the present disclosure.
Figure 2:
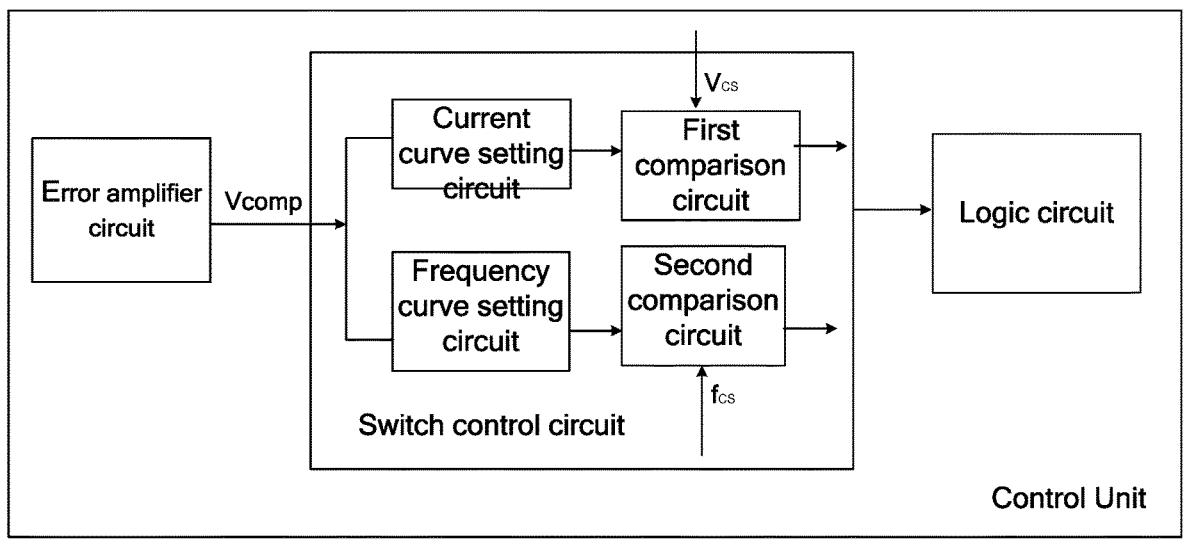
FIG. 2 is a specific circuit block diagram of a control circuit in FIG. 1.

FIG. 1 is a circuit block diagram of a first embodiment of an asymmetric switched-mode power supply according to the present disclosure. FIG. 2 is a specific circuit block diagram of a control circuit in FIG. 1. In the embodiment of the present disclosure, the switched-mode power supply includes a main switch transistor and an auxiliary switch transistor, both of which form a half-bridge. The auxiliary switch transistor and a first inductor, a first capacitor, and a primary winding in a transformer form a resonant loop. The control circuit U1 includes an error amplifier circuit, a switch control circuit, a logic circuit, a first driver, and a second driver. The error amplifier circuit, the switch control circuit, and the logic circuit form the control circuit U1. The error amplifier circuit detects an output feedback signal of the switched-mode power supply to obtain an error compensation signal $V_{comp}$, which can be obtained through compensation after performing error amplification by the output feedback signal and a reference signal. The switch control circuit is configured to receive the error compensation signal to set a first current curve and a first frequency curve based on the error compensation signal. The switch control circuit receives an inductor current sampling signal and an operating frequency signal of the switched-mode power supply, and controls on-off states of the main switch transistor and the auxiliary switch transistor according to comparison between the inductor current sampling signal and the first current curve and comparison between the operating frequency signal and the first frequency curve.

Figure 5:
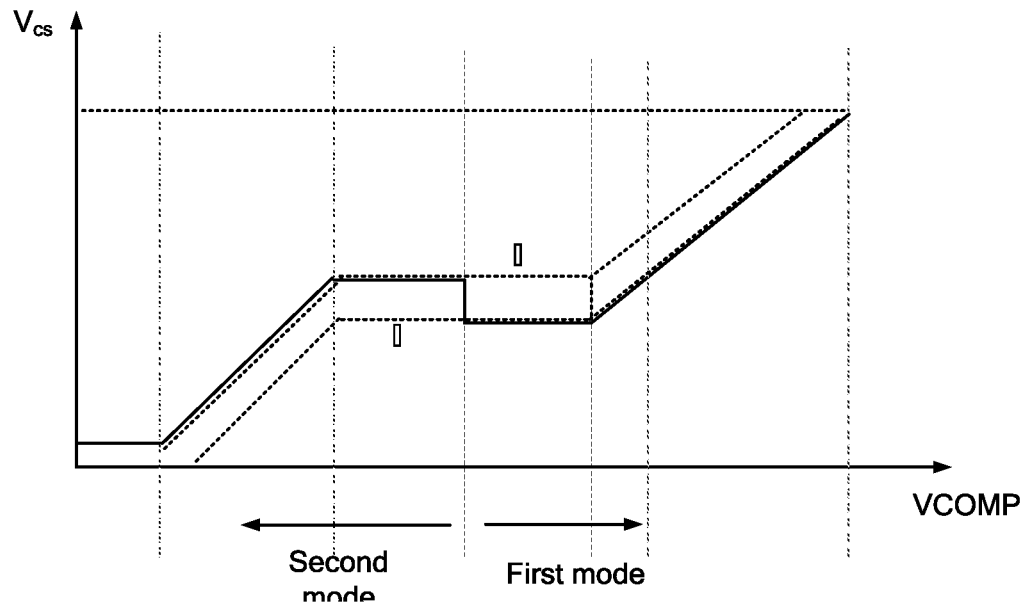
FIG. 5 is a schematic diagram of a first current curve according to the present disclosure.
Figure 6:
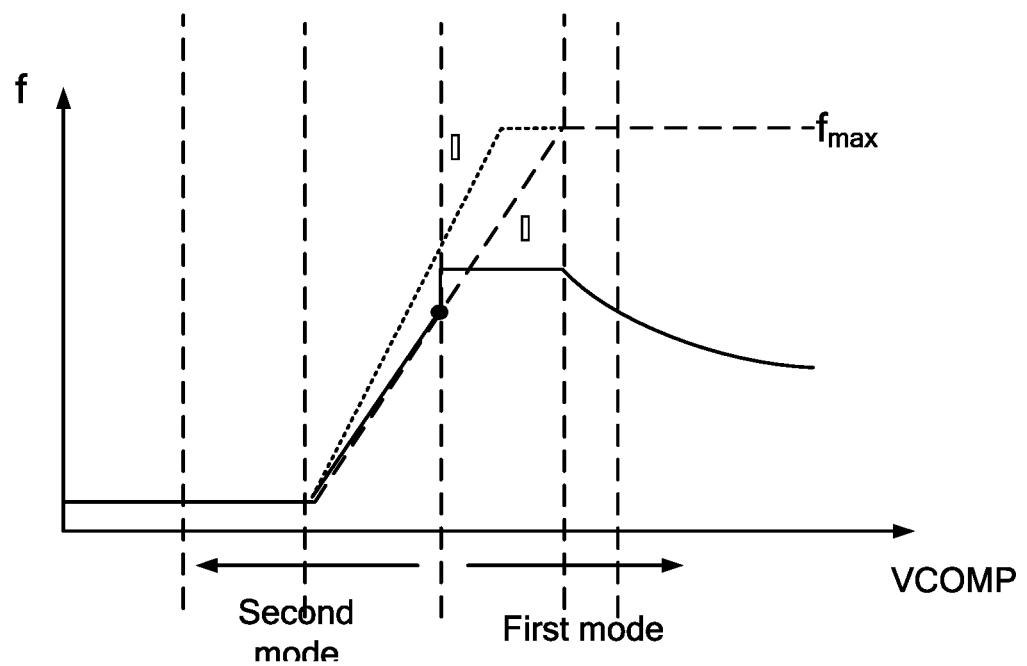
FIG. 6 is a schematic diagram of a first frequency curve according to the present disclosure.

In one example, the switch control circuit includes a current curve setting circuit and a frequency curve setting circuit. An operating mode of the switched-mode power supply is set according to the error compensation signal, and the current curve setting circuit sets the first current curve according to the operating mode of the switched-mode power supply, as shown in a curve in FIG. 5, $V_{CS}$ is voltage information corresponding to an inductor current. The frequency curve setting circuit sets the first frequency curve according to the operating mode of the switched-mode power supply, as shown in a curve in FIG. 6. In the embodiment of the present disclosure, the operating mode of the switched-mode power supply includes a first mode and a second mode. One operating period of the first mode includes a switch period of a BCM, and the first mode is recorded as a BCM. One operating period of the second mode includes N switch periods of BCMs and a switch period of a DCM, and the second mode is recorded as a BUR mode. For example, when the load power is large, the switched-mode power supply works in the second mode, and when the load power is small, the switched-mode power supply works in the first mode. Specifically, after the operating mode of the switched-mode power supply is switched, the corresponding first current curve or first frequency curve will be adjusted accordingly. For example, when the switched-mode power supply enters the first mode from the second mode, the $V_{CS}$ value of the first current curve is decreased, and the value of the frequency line is increased. When the switched-mode power supply enters the second mode from the first mode, the $V_{CS}$ value of the first current curve is increased, and the value of the frequency line is decreased. In FIG. 5 and FIG. 6, ① represents a curve relationship in the first mode, and ② represents a curve relationship in the second mode. In different modes, the curve relationships are different.

In one example, the switch control circuit includes a first comparison circuit and a second comparison circuit. When the switched-mode power supply operates in a certain mode, the first comparison circuit compares the inductor current sampling signal of the switched-mode power supply with the first current curve to control the on-off state of the main switch transistor, and the second comparison circuit compares the operating frequency signal of the switched-mode power supply with the first frequency curve to control the on-off state of the auxiliary switch transistor. For example, an inductor current sampling signal of the switched-mode power supply at a certain time is compared with a sampling signal corresponding to the first current curve, so that the main switch transistor may be controlled to be turned off, and an operating frequency signal of the switched-mode power supply at a certain time is compared with a frequency corresponding to the first frequency curve, so that the auxiliary switch transistor may be controlled to be turned off. In FIG. 5, a dotted line is a preset inductor current curve, and a solid line represents an actual inductor current sampling signal. In FIG. 6, a dotted line is a preset frequency curve, and a solid line represents an actual operating frequency.

Exemplarily, with reference to FIG. 1, the switched-mode power supply includes a primary winding, a secondary winding, and an auxiliary winding, and the control circuit further includes an input terminal configured to receive a voltage across any one of the primary winding, the secondary winding, and the auxiliary winding. As shown in FIG. 1, the voltage $V_S$ across the auxiliary winding is taken as the voltage at the input terminal. The control circuit determines a zero cross time of a drain-source voltage of the main switch transistor according to the voltage received at the input terminal to control the on-off states of the main switch transistor and of the auxiliary switch transistor. A drain-source voltage of the main switch transistor herein is determined based on the voltage received at the input terminal, and then compared with a preset power supply threshold (such as the input voltage) to determine the zero cross time of the drain-source voltage of the main switch transistor, so as to control the auxiliary switch transistor to be turned off. The main switch transistor is controlled to be turned on after a turn-off delay of the auxiliary switch transistor for a predetermined time (such as half of a resonant period or a quarter of a resonant period). In this way, the main switch transistor can always be turned on at or near zero voltage in each switch period.

In one example, the switch control circuit further includes a logic circuit. The control circuit further includes a first driver and a second driver. The logic circuit generates switch control signals of the main switch transistor and of the auxiliary switch transistor according to comparison results of the first comparison circuit and the second comparison circuit as well as the zero cross time of the drain-source voltage of the main switch transistor. The first driver receives the switch control signal of the main switch transistor to drive an on-off action of the main switch transistor. The second driver receives the switch control signal of the auxiliary switch transistor to drive an on-off action of the auxiliary switch transistor.

Figure 3:
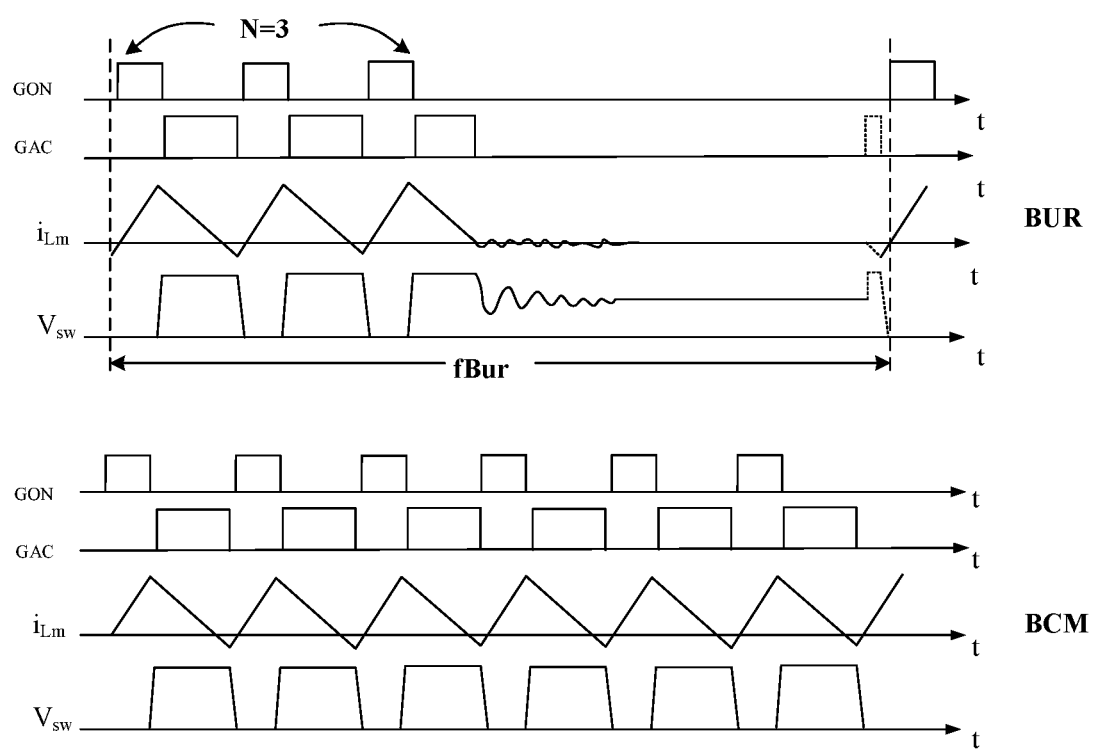
FIG. 3 is an operating waveform diagram according to FIG. 1.

FIG. 3 is an operating waveform diagram according to FIG. 1. In FIG. 3, GON is the switch control signal of the main switch transistor. GAC is the switch control signal of the auxiliary switch transistor. $i_{Lm}$ is the inductor current. $V_{SW}$ is the drain-source voltage of the main switch transistor. The second mode is recorded as BUR. The first mode is recorded as BCM. A operating period of the BUR is N switch periods of BCMs plus a switch period of a DCM, and is recorded as operating period. As shown in FIG. 3, N is 3. In the embodiment of the present disclosure, when the switched-mode power supply operates in the BUR mode, and at the time that the switched-mode power supply enters the next operating period from one operating period, the operating frequency signal of the switched-mode power supply is compared with the first frequency curve to control turn-on of the auxiliary switch transistor according to a comparison result, such that the auxiliary switch transistor is turned on once again before the next operating period starts, and zero voltage conduction of the main switch transistor is realized. Alternatively, when the switched-mode power supply enters the first mode from the current second mode, the operating frequency signal of the switched-mode power supply is compared with the first frequency curve to control turn-on of the auxiliary switch transistor according to a comparison result, such that the auxiliary switch transistor is turned on once again before the next first mode starts, a drain-source parasitic voltage of the main switch transistor is discharged, and zero voltage conduction of the main switch transistor is realized. Then, the switched-mode power supply enters the BCM operating mode.

Through the above control method of the switched-mode power supply, in the asymmetric half-bridge switched-mode power supply, the switched-mode power supply is controlled to operate in the first mode and the second mode, and the auxiliary switch transistor is controlled to be turned on and turned off, such that the main switch transistor can be turned on at or near zero voltage, thereby reducing switching loss, and improving the system operating efficiency.

Figure 4:
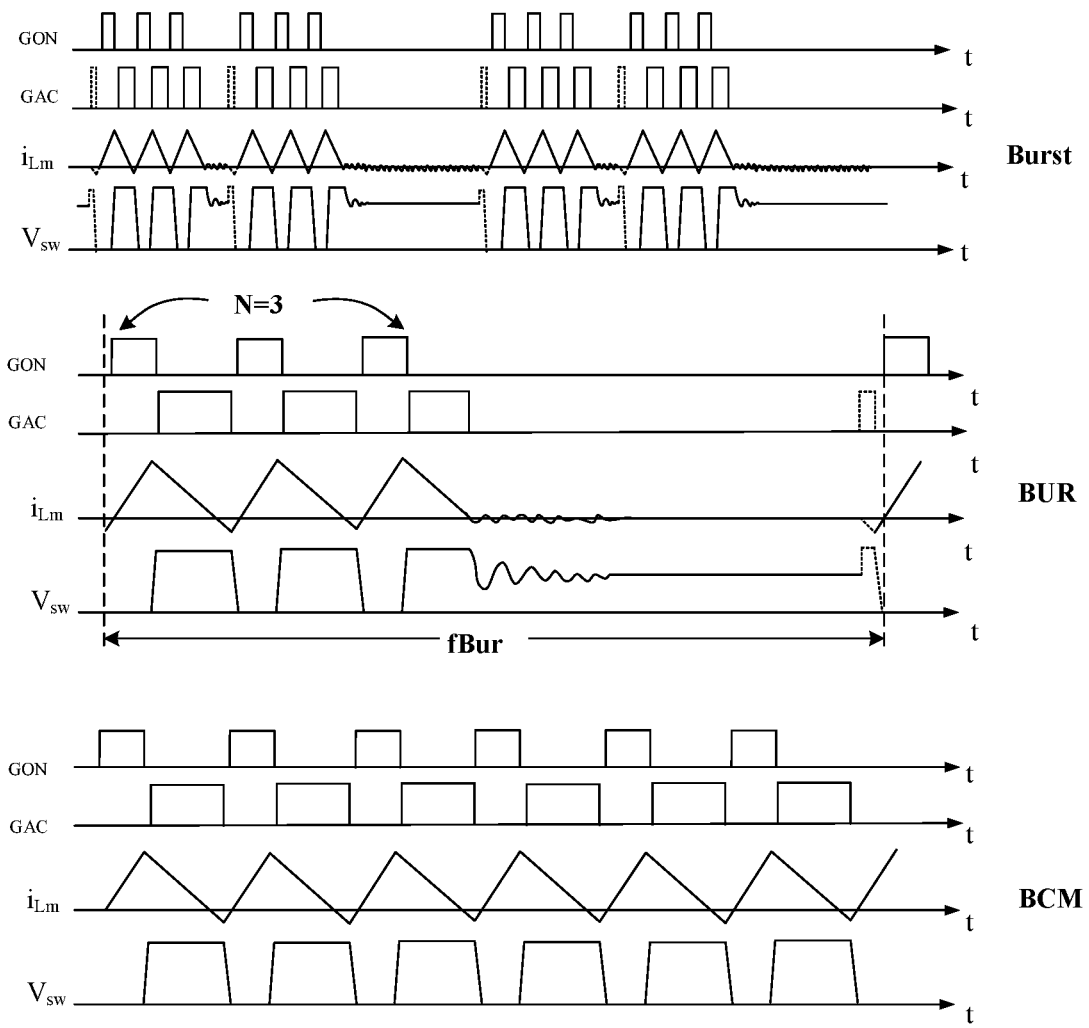
FIG. 4 is another operating waveform diagram according to FIG. 1.

In one example, as shown in FIG. 4, FIG. 4 is another operating waveform diagram according to FIG. 1. When the load power is extremely low, the switched-mode power supply is controlled to enter a third mode, such as a Burst mode. One operating period of the third mode includes M operating periods of second mode with periodic time limitation plus a period of stop time. With reference to FIG. 4, M is 2. The periodic time limitation herein means that the operating period of the second mode herein is different from the operating period during operation in the second mode, for example, is less than the operating period during operation in the second mode. The period of stop time is a preset non-operating time of the switched-mode power supply. In this way, in this process, the values of the first current curve and of the first frequency curve are both adjusted to be relatively low, such that low power output can be well realized.

Figure 7:
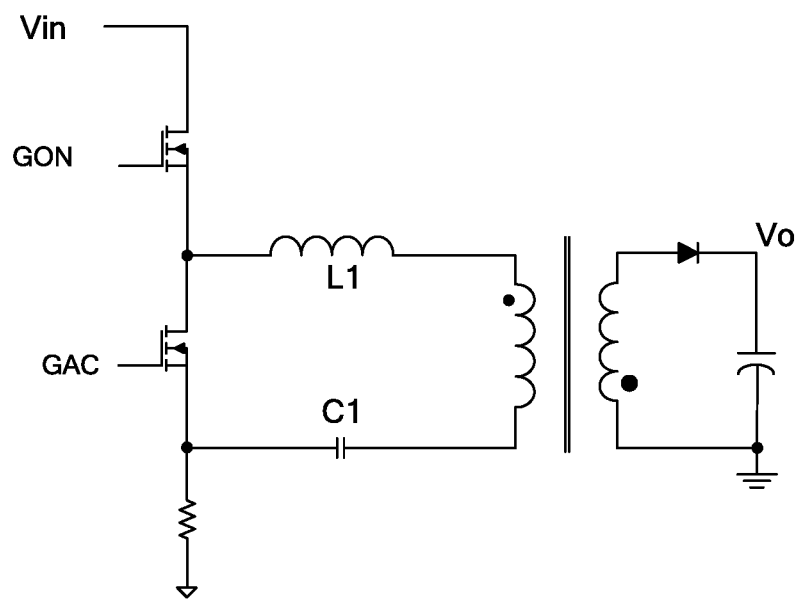
FIG. 7 is a circuit block diagram of a second embodiment of the asymmetric switched-mode power supply according to the present disclosure.

FIG. 7 is a circuit block diagram of a second embodiment of the asymmetric switched-mode power supply according to the present disclosure. The implementations of the control circuit of the present disclosure can all be applied to the topology of the switched-mode power supply shown in FIG. 7.

The embodiments described above do not constitute a limitation on the scope of protection of the technical solution of the present disclosure. Any modification, equivalent replacement, and improvement made within the spirit and principle of the above-mentioned embodiments shall fall within the scope of protection of the technical solution of the present disclosure.

What is claimed is:

1. A control circuit of a switched-mode power supply, wherein the switched-mode power supply comprises a main switch transistor and an auxiliary switch transistor, wherein the main switch transistor and the auxiliary switch transistor form a half-bridge, and the control circuit comprises:
   an error amplifier circuit, configured to receive an output feedback signal of the switched-mode power supply to obtain an error compensation signal; and
   a switch control circuit, configured to receive the error compensation signal to set a current curve and a frequency curve based on the error compensation signal, wherein the switch control circuit receives an inductor current sampling signal of the switched-mode power supply and an operating frequency signal of the switched-mode power supply, and the switch control circuit controls an on-off state of the main switch transistor and an on-off state of the auxiliary switch transistor according to a comparison between the inductor current sampling signal and the current curve and a comparison between the operating frequency signal and the frequency curve, wherein the auxiliary switch transistor and an inductor, a capacitor, and a primary winding in a transformer form a resonant loop, wherein the capacitor and the inductor are directly connected to each other via the primary winding.

2. The control circuit according to claim 1, wherein the current curve is a variation curve of a preset inductor current signal with the error compensation signal; and the frequency curve is a variation curve of a preset system operating frequency with the error compensation signal.

3. The control circuit according to claim 2, wherein the switch control circuit comprises a current curve setting circuit and a frequency curve setting circuit,
   an operating mode of the switched-mode power supply is set according to the error compensation signal, and
   the current curve setting circuit sets the current curve according to the operating mode of the switched-mode power supply;
   the frequency curve setting circuit sets the frequency curve according to the operating mode of the switched-mode power supply; and
   the operating mode of the switched-mode power supply comprises a first mode and a second mode, one operating period of the first mode comprises a switch period of a boundary conduction mode (BCM), and one operating period of the second mode comprises N switch periods of BCMs and a switch period of a discontinuous conduction mode (DCM).

4. The control circuit according to claim 3, wherein the switch control circuit comprises a first comparison circuit and a second comparison circuit, and
   when the switched-mode power supply operates in the first mode or the second mode, the first comparison circuit compares the inductor current sampling signal of the switched-mode power supply with the current curve to control the on-off state of the main switch transistor; and the second comparison circuit compares the operating frequency signal of the switched-mode power supply with the frequency curve to control the on-off state of the auxiliary switch transistor.

5. The control circuit according to claim 1, wherein the switched-mode power supply comprises a primary winding, a secondary winding, and an auxiliary winding,
   the control circuit further comprises an input terminal configured to receive a voltage across one of the primary winding, the secondary winding, and the auxiliary winding, and
   the control circuit determines a zero cross time of a drain-source voltage of the main switch transistor according to the voltage received at the input terminal to control the on-off state of the main switch transistor and the on-off state of the auxiliary switch transistor.

6. The control circuit according to claim 4, further comprising a logic circuit, a first driver, and a second driver, wherein
   the logic circuit generates a switch control signal of the main switch transistor and a switch control signal of the auxiliary switch transistor according to a comparison result of the first comparison circuit and a comparison result of the second comparison circuit and a zero cross time of a drain-source voltage of the main switch transistor;
   the first driver receives the switch control signal of the main switch transistor to drive an on-off action of the main switch transistor; and
   the second driver receives the switch control signal of the auxiliary switch transistor to drive an on-off action of the auxiliary switch transistor.

7. The control circuit according to claim 3, wherein the operating mode of the switched-mode power supply further comprises a third mode, and
   one operating period of the third mode comprises M operating periods of second mode with periodic time limitation plus a period of stop time.

8. A control method of a switched-mode power supply, wherein the switched-mode power supply comprises a main switch transistor and an auxiliary switch transistor, the main switch transistor and the auxiliary switch transistor form a half-bridge, and the control method comprises:
 controlling an operating mode of the switched-mode power supply in a first mode and a second mode according to an output feedback signal of the switched-mode power supply, wherein one operating period of the first mode comprises a switch period of a BCM, and one operating period of the second mode comprises N switch periods of BCMs and a switch period of a DCM, and
 turning on the auxiliary switch transistor once to discharge a parasitic capacitor of the main switch transistor when the switched-mode power supply enters a next operating period from one operating period of a current second mode before the next operating period starts or when the switched-mode power supply enters the first mode from the current second mode before the first mode starts, to realize a zero voltage conduction of the main switch transistor, wherein the auxiliary switch transistor and an inductor, a capacitor, and a primary winding in a transformer form a resonant loop, and wherein the capacitor and the inductor are directly connected to each other via the primary winding.

9. The control method according to claim 8, further comprising:
 setting the operating mode of the switched-mode power supply according to the output feedback signal of the switched-mode power supply, and
 setting a current curve and a frequency curve according to the operating mode of the switched-mode power supply; and
 when the switched-mode power supply operates in the first mode or the second mode, controlling an on-off state of the main switch transistor and/or an on-off state of the auxiliary switch transistor according to a comparison result between an inductor current sampling signal of the switched-mode power supply and the current curve and a comparison result between an operating frequency signal of the switched-mode power supply and the frequency curve.

10. The control method according to claim 9, wherein a process of turning on the auxiliary switch transistor when the switched-mode power supply enters a next operating period from one operating period of a current second mode before the next operating period starts or when the switched-mode power supply enters the first mode from the current second mode before the first mode starts, comprises the following steps: comparing the operating frequency signal of the switched-mode power supply with the frequency curve to control a turn-on of the auxiliary switch transistor according to a comparison result.

11. The control method according to claim 9, wherein the operating mode of the switched-mode power supply is controlled in the first mode, the second mode, and a third mode according to the output feedback signal of the switched-mode power supply, and
 one operating period of the third mode comprises M operating periods of second mode with periodic time limitation plus a period of stop time.

12. A switched-mode power supply, comprising a main switch transistor and an auxiliary switch transistor, the main switch transistor and the auxiliary switch transistor form a half-bridge, wherein the auxiliary switch transistor and an inductor, a capacitor, and a primary winding in a transformer of the switched-mode power supply form a resonant loop, and the switched-mode power supply further comprises the control circuit according to claim 1.

13. The switched-mode power supply according to claim 12, wherein the control circuit, wherein the current curve is a variation curve of a preset inductor current signal with the error compensation signal; and
 the frequency curve is a variation curve of a preset system operating frequency with the error compensation signal.

14. The switched-mode power supply according to claim 13, wherein the control circuit, wherein the switch control circuit comprises a current curve setting circuit and a frequency curve setting circuit,
 an operating mode of the switched-mode power supply is set according to the error compensation signal, and
 the current curve setting circuit sets the current curve according to the operating mode of the switched-mode power supply;
 the frequency curve setting circuit sets the frequency curve according to the operating mode of the switched-mode power supply; and
 the operating mode of the switched-mode power supply comprises a first mode and a second mode, one operating period of the first mode comprises a switch period of a boundary conduction mode (BCM), and one operating period of the second mode comprises N switch periods of BCMs and a switch period of a discontinuous conduction mode (DCM).

15. The switched-mode power supply according to claim 14, wherein the control circuit, wherein the switch control circuit comprises a first comparison circuit and a second comparison circuit, and
 when the switched-mode power supply operates in the first mode or the second mode, the first comparison circuit compares the inductor current sampling signal of the switched-mode power supply with the current curve to control the on-off state of the main switch transistor; and the second comparison circuit compares the operating frequency signal of the switched-mode power supply with the frequency curve to control the on-off state of the auxiliary switch transistor.

16. The switched-mode power supply according to claim 12, wherein the control circuit, wherein the switched-mode power supply comprises a primary winding, a secondary winding, and an auxiliary winding,
 the control circuit further comprises an input terminal configured to receive a voltage across one of the primary winding, the secondary winding, and the auxiliary winding, and
 the control circuit determines a zero cross time of a drain-source voltage of the main switch transistor according to the voltage received at the input terminal to control the on-off state of the main switch transistor and the on-off state of the auxiliary switch transistor.

17. The switched-mode power supply according to claim 15, wherein the control circuit further comprises a logic circuit, a first driver, and a second driver, wherein
 the logic circuit generates a switch control signal of the main switch transistor and a switch control signal of the auxiliary switch transistor according to a comparison result of the first comparison circuit and a comparison result of the second comparison circuit and a zero cross time of a drain-source voltage of the main switch transistor;

the first driver receives the switch control signal of the main switch transistor to drive an on-off action of the main switch transistor; and the second driver receives the switch control signal of the auxiliary switch transistor to drive an on-off action of the auxiliary switch transistor.

18. The switched-mode power supply according to claim 14, wherein the control circuit, wherein the operating mode of the switched-mode power supply further comprises a third mode, and one operating period of the third mode comprises M operating periods of second mode with periodic time limitation plus a period of stop time.

\* \* \* \* \*